United States Patent
Hiruta (10) Patent No.: US 11,860,624 B2
(45) Date of Patent: Jan. 2, 2024

(54) VEHICLE CONTROL SYSTEM AND MOBILE DEVICE

(71) Applicant: HONDA MOTOR CO., LTD., Tokyo (JP)

(72) Inventor: Shigenori Hiruta, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 493 days.

(21) Appl. No.: 17/095,374

(22) Filed: Nov. 11, 2020

(65) Prior Publication Data
US 2021/0149388 A1 May 20, 2021

(30) Foreign Application Priority Data
Nov. 20, 2019 (JP) .................. 2019-209800

(51) Int. Cl.
| | |
|---|---|
| *G05D 1/00* | (2006.01) |
| *G08B 21/24* | (2006.01) |
| *B60R 25/34* | (2013.01) |
| *B60R 25/102* | (2013.01) |
| *B60R 25/01* | (2013.01) |
| *H04M 1/72415* | (2021.01) |

(52) U.S. Cl.
CPC ............ *G05D 1/0011* (2013.01); *B60R 25/01* (2013.01); *B60R 25/102* (2013.01); *B60R 25/34* (2013.01); *G08B 21/24* (2013.01); *H04M 1/72415* (2021.01)

(58) Field of Classification Search
CPC . B60R 2325/205; B60R 25/01; B60R 25/102; B60R 25/24; B60R 25/34; G05D 1/0011; G08B 21/24; H04M 1/72415; H04M 1/6075; H04M 2250/22; H04M 1/72427; H04M 1/72442; H04M 1/72445
See application file for complete search history.

(56) References Cited

U.S. PATENT DOCUMENTS

| | | | | |
|---|---|---|---|---|
| 7,970,436 B1* | 6/2011 | Katzer | ............... | H04M 1/6075 |
| | | | | 455/3.06 |
| 9,786,154 B1* | 10/2017 | Potter | ................... | G08B 21/02 |
| 9,961,507 B1* | 5/2018 | Mendelson | ........... | H04W 4/029 |
| 10,185,327 B1* | 1/2019 | Konrardy | ............... | G05B 15/02 |
| 10,212,663 B2* | 2/2019 | Meacci | ............. | H04W 52/0235 |
| 10,391,977 B1* | 8/2019 | Chhorn | ................... | B60R 25/31 |

(Continued)

FOREIGN PATENT DOCUMENTS

| | | | | |
|---|---|---|---|---|
| CN | 110321677 A | | 10/2019 | |
| CN | 111182513 A | * | 5/2020 | ........... B60R 25/209 |

(Continued)

OTHER PUBLICATIONS

Japanese Office Action dated Oct. 19, 2021, with English translation, 7 pages.
Chinese Office Action dated May 16, 2022, 7 pages.

*Primary Examiner* — Babar Sarwar
(74) *Attorney, Agent, or Firm* — Rankin, Hill & Clark LLP (57) ABSTRACT

A vehicle control system includes: a vehicle control unit that remotely controls a PW, which is a control object, based on a signal from a mobile device; a mobile-side stop processing unit that performs stop process for stopping the PW upon transition to a predetermined operation state in which user operations are restricted while the PW is in operation by the remote control.

9 Claims, 7 Drawing Sheets

(56) References Cited

U.S. PATENT DOCUMENTS

| | | | |
|---|---|---|---|
| 10,919,490 B1* | 2/2021 | Akhoirshida | B60R 25/33 |
| 10,924,924 B1* | 2/2021 | Hassani | H04W 4/80 |
| 10,950,147 B1* | 3/2021 | Eggenwirth | G09F 3/0329 |
| 2014/0062688 A1* | 3/2014 | Aoki | B60R 1/12 |
| | | | 340/441 |
| 2014/0128049 A1* | 5/2014 | Aoki | B60K 37/02 |
| | | | 455/418 |
| 2015/0130589 A1* | 5/2015 | Miyazawa | G07C 9/00309 |
| | | | 340/5.61 |
| 2016/0049033 A1* | 2/2016 | Sigal | B60R 25/24 |
| | | | 340/5.61 |
| 2016/0368454 A1* | 12/2016 | Rork | G07C 9/215 |
| 2018/0087295 A1* | 3/2018 | Lickfelt | B60C 5/005 |
| 2018/0108259 A1* | 4/2018 | Lin | G08G 1/005 |
| 2018/0118163 A1* | 5/2018 | Murakami | B60R 25/01 |
| 2018/0297558 A1* | 10/2018 | Froitzheim | E05B 83/36 |
| 2019/0080532 A1* | 3/2019 | Lee | B60R 25/241 |
| 2019/0116556 A1* | 4/2019 | Golsch | H04W 12/08 |
| 2019/0168711 A1* | 6/2019 | Oesterling | B60R 25/305 |
| 2019/0248331 A1* | 8/2019 | Salah | G01S 5/0284 |
| 2020/0074753 A1* | 3/2020 | Adiga | G07F 17/244 |
| 2020/0238928 A1* | 7/2020 | Sandu | E04H 15/08 |
| 2021/0053530 A1* | 2/2021 | Bohl | B60R 25/102 |

FOREIGN PATENT DOCUMENTS

| | | | | |
|---|---|---|---|---|
| DE | 102016003129 A1 * | 9/2017 | | |
| DE | 102017122021 A1 * | 3/2019 | | |
| EP | 1885107 A1 * | 2/2008 | | G01C 21/36 |
| GB | 2502589 A * | 12/2013 | | H04M 1/6075 |
| JP | 2016-076866 A | 5/2016 | | |
| JP | 2018-204474 | 12/2018 | | |
| JP | 2019-187358 A | 10/2019 | | |
| WO | WO-2018211943 A1 * | 11/2018 | | B60C 23/04 |

\* cited by examiner

FIG.7

VEHICLE CONTROL SYSTEM AND MOBILE DEVICE

INCORPORATION BY REFERENCE

The present application claims priority under 35 U.S.C. § 119 to Japanese Patent Application No. 2019-209800 filed on Nov. 20, 2019. The content of the application is incorporated herein by reference in its entirety.

BACKGROUND OF THE INVENTION

Field of the Invention

The present invention relates to a vehicle control system and a mobile device.

Description of the Related Art

There is known a center-type remote startup system that transmits a startup request from a mobile device owned by a user to a vehicle remotely located via a center server (see Japanese Translation of PCT International Application Publication No. 2018-204474). This remote startup system includes a stop unit that stops a drive unit when the communication between the mobile device and the center server or between the center server and the vehicle is interrupted while the drive device is started and is in operation based on the startup request. Japanese Translation of PCT International Application Publication No. 2018-204474 illustrates the use of a smartphone or tablet terminal as a mobile device.

Here, when a smartphone or tablet terminal is adopted as a mobile device, the mobile device may transition to a sleep state or a state in which an application for remote control is executed in the background after a certain period of time. The transition to the sleep state or the background execution state not only restricts the user operation but also requires time to return from the sleep state or the like. This may lead to a situation in which the control object in operation cannot be stopped at a timing desired by the user, and the control object may continue to operate against the intention of the user.

Therefore, an object of the present invention is to make it possible to avoid a situation in which a control object continues to operate also when the mobile device transitions to a state in which a predetermined user operation is restricted.

SUMMARY OF THE INVENTION

In order to achieve the above object, a vehicle control system includes: a mobile device capable of communicating with a vehicle having a control object, the mobile device having a function of transitioning to a predetermined operating state in which a predetermined user operation is restricted; a vehicle control unit that remotely controls the control object based on a signal from the mobile device; and a stop processing unit that performs a stop process for stopping the control object upon transition to the predetermined operating state while the control object is in operation by the remote control.

In the above configuration, the stop processing unit may have a mobile-side monitoring unit that is provided in the mobile device and that detects, as the predetermined operating state, at least one of a sleep state of the mobile device or a state in which an application for performing the remote control shifts from a foreground to a background.

Further, in the above configuration, the stop processing unit may have a mobile-side stop processing unit that is provided in the mobile device and that causes the mobile device to transmit an operation stop signal for stopping the control object when the mobile-side monitoring unit detects a transition to the predetermined operating state while the control object is in operation by the remote control.

Further, the above configuration may have: a vehicle-side monitoring unit provided on the vehicle, the vehicle-side monitoring unit detecting a disconnected state of a communication connection between the mobile device and the vehicle; and a vehicle-side stop processing unit provided on the vehicle, the vehicle-side stop processing unit stopping the control object when the vehicle-side monitoring unit detects the disconnection state while the controlled object is in operation by the remote control.

Further, the above configuration may be such that: the control object includes an open-close device having an automatic open-close function; and the vehicle control system has a notification processing unit that performs a notification process for notifying a user of the mobile device about forgetting to close the open-close device when the stop processing unit performs the stop process while the open-close device is in closing operation.

Further, the above configuration may be such that the notification process is performed when the stop process is performed while the open-close device is in closing operation and when the mobile device moves out of a communication area of the vehicle.

Further, the above configuration may be such that: the mobile device has a function of remotely controlling a door lock of the vehicle, and the notification process is performed when the stop process is performed while the open-close device is in closing operation, and when the door lock is controlled to the locked state.

Further, the above configuration may be such that the control object includes at least any of a power window, a power sliding door, a power tailgate, and a power door.

Further, the above configuration may be such that the communication between the vehicle and the mobile device is short-range wireless communication.

Further, in a mobile device that can communicate with a vehicle to remotely control a control object belonging to the vehicle and has a function of transitioning to a predetermined operating state in which a predetermined user operation is restricted, the mobile device may include a stop processing unit that performs a stop process for stopping the control object upon transition to the predetermined operating state while the control object is in operation by the remote control.

According to an aspect of the present invention, even when the mobile device transitions to a state in which a predetermined user operation is restricted, it is possible to avoid a situation in which the control object continues to operate.

DETAILED DESCRIPTION OF THE PREFERRED EMBODIMENTS

Embodiments of the present invention are described below with reference to the drawings.

Figure 1:
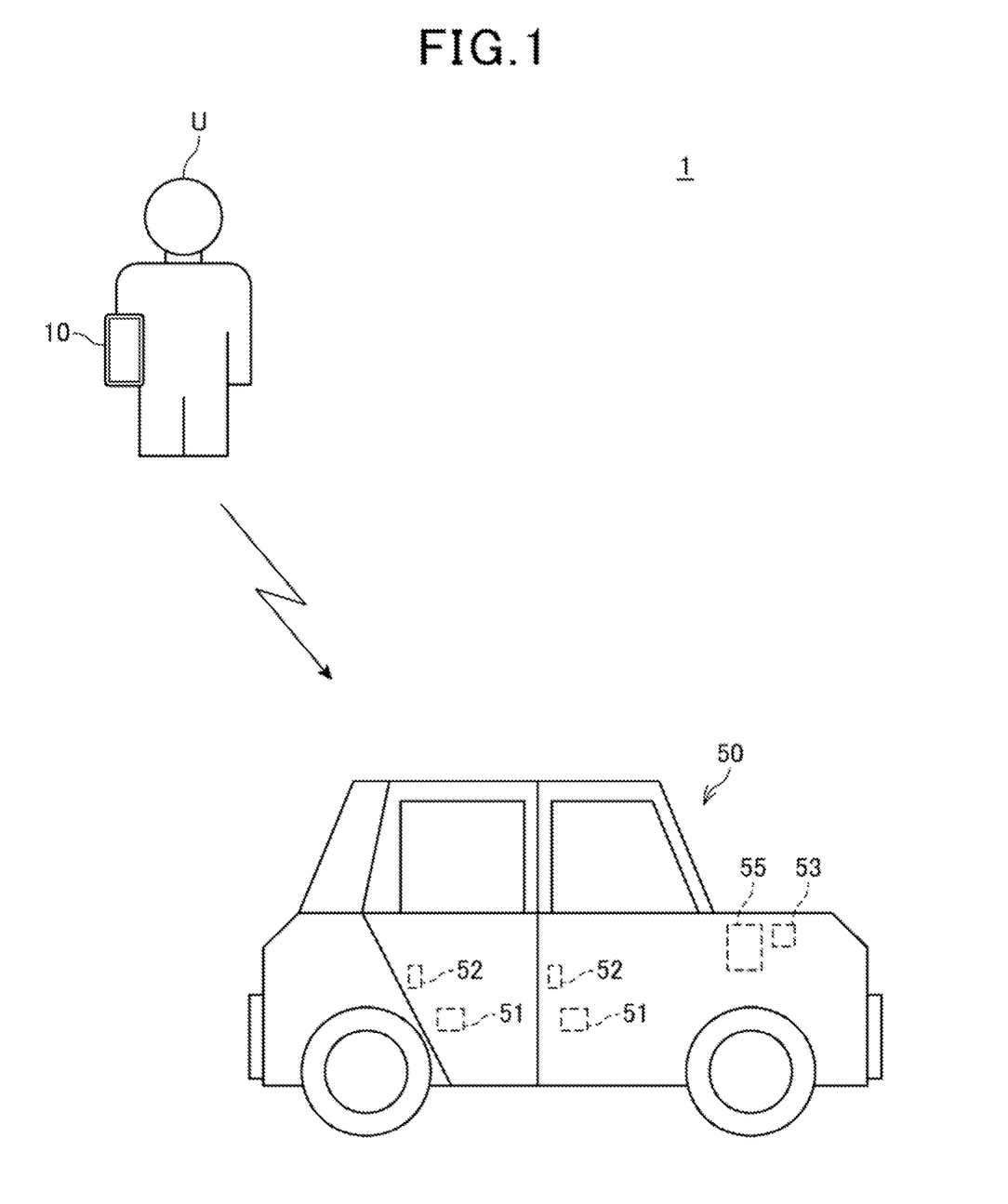
FIG. 1 is a diagram showing a schematic configuration of a vehicle control system according to an embodiment of the present invention.

FIG. 1 is a diagram showing a schematic configuration of a vehicle control system according to an embodiment of the present invention. The vehicle control system 1 is a system that remotely controls control objects 51 and 52 of a vehicle 50 by utilizing a mobile device 10 carried by a user U, and assumes that a smartphone owned by the user U is used for the mobile device 10.

In general, a smartphone has: a function that transitions to a sleep state in which the display and the like are stopped (for example, the image is darkened) after a certain period of preset time elapses in order to save power; and a function to perform background processing that switches a running application from foreground to background execution when executing or switching to an alternative application to realize a multitasking environment.

In the sleep state, most user operations are not accepted, and it is necessary to return from the sleep state in order to perform the unacceptable user operations, so that it takes time to perform the user operations. Further, when the application to be operated is inactive and is executed in the background, a what is called application switching operation is required to operate the application, so that it takes time to perform the user operation accordingly.

That is, the mobile device 10 of this embodiment has a function of transitioning to a predetermined operation state (sleep state, and/or background execution state) in which a predetermined user operation is restricted.

The control object 51 in this embodiment is a power window (also referred to as a power window module, hereinafter referred to as "PW 51") that automatically opens and closes each window of the vehicle 50, and The control object 52 is a door lock (also referred to as a door lock module, hereinafter referred to as "door lock 52") that can lock and unlock each door of the vehicle 50.

Since it takes about several seconds for the PW 51 to operate from the open state to the closed state, the PW 51 is an electrical component having a long time from the start of operation to the end of operation among the many electrical components of the vehicle 50. In a case where only the function to remotely control the PW 51 is added to the conventional smartphone, when the smartphone shifts to the "predetermined operating state" including the sleep state or the background execution state, a situation arises in which the PW 51 cannot be stopped during that time. Accordingly, in this embodiment, there is realized the vehicle control system 1 that can avoid the situation where the PW 51 cannot be stopped.

The mobile device 10 and the vehicle 50 configuring the vehicle control system 1 is described below.

Figure 2:
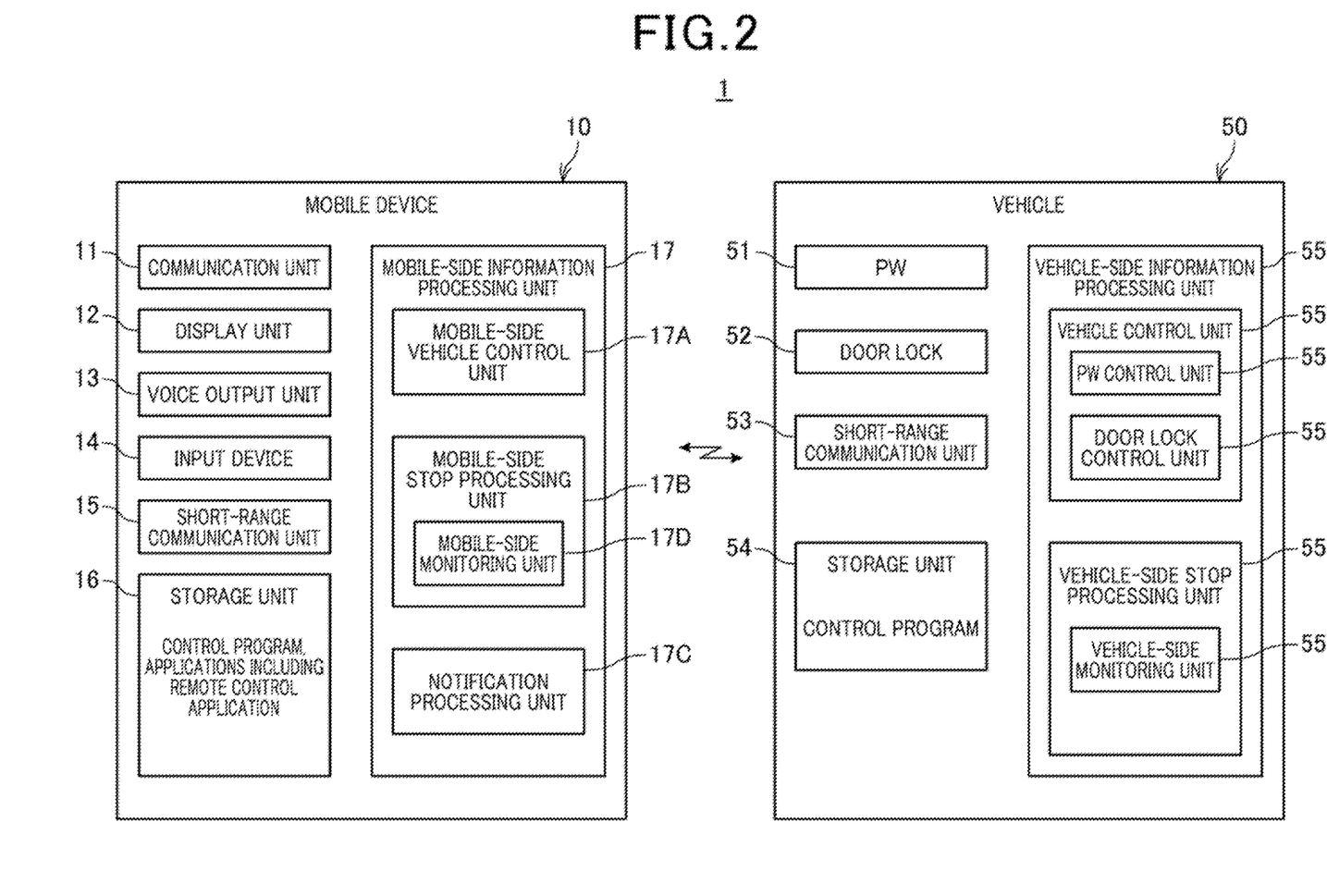
FIG. 2 is a block diagram showing a configuration of a mobile device and a vehicle.

FIG. 2 is a block diagram showing a configuration of the mobile device 10 and the vehicle 50. Note that FIG. 2 shows the configuration relating to the vehicle control system 1, and omits other configurations of general smartphones and vehicles.

The mobile device 10 includes a communication unit 11, a display unit 12, a voice output unit 13, an input device 14, a short-range communication unit 15, a storage unit 16 (memory), and a mobile-side information processing unit 17. The communication unit 11 has a communication module for utilizing a public wireless communication network, and the communication unit 11 enables communication for making a telephone call and data communication with an external device connected to the Internet or the like. The communication unit 11 is also utilized when downloading an application such as an application for remotely controlling the vehicle 50 (hereinafter, referred to as a "remote control application") via the Internet.

The display unit 12 has a display device (display) such as a liquid crystal display device, and the display unit 12 can display various information and displays an operation screen or the like for the user U to input various instructions in this embodiment. The voice output unit 13 has a speaker and can output various voices. The input device 14 has a known input interface such as a touch panel which can detect a touch operation on the displayed operation screen, an operation button and a microphone, and outputs an input result to the mobile-side information processing unit 17. Further, when the application including the remote control application is executed, the remote control operation screen is displayed on the display unit 12, and the user instructions regarding the remote control is input mainly via the touch panel.

The short-range communication unit 15 has a known communication module for short-range wireless communication such as Bluetooth (registered trademark), and utilizing the short-range communication unit 15 enables the mobile device 10 and the vehicle 50 to communicate with each other. Registration work such as pairing in advance between the mobile device 10 and the vehicle 50 enables them to automatically establish a communication connection with each other when they reach a distance where they can communicate with each other.

The storage unit. 16 stores data of a control program utilized by the mobile-side information processing unit 17, and a plurality of applications and the like including a remote control application. Note that the application is not limited to the one downloaded by the user U via the Internet, but includes the one pre-installed in the mobile device 10.

The mobile-side information processing unit 17 is configured with an arithmetic processing circuit including a CPU (Central Processing Unit) and peripheral circuits thereof, and functions as a computer that controls each unit of the mobile device 10 according to a control program or the like stored in the storage unit 16. The mobile-side information processing unit 17 has: a function of executing any applications including a remote control application according to a user operation; and also a function of shifting the mobile device 10 to a "predetermined operating state (sleep state and/or background execution state in this embodiment)" in which user operations are restricted.

The mobile-side information processing unit 17 functions as: a mobile-side vehicle control unit 17A that performs process including remote control of the vehicle 50 based on user operation by executing the remote control application; a mobile-side stop processing unit 17B that performs stop process relating to remote control; and a notification processing unit 17C that performs notification process relating to remote control.

As shown in FIG. 2, the mobile-side stop processing unit 17B has a mobile-side monitoring unit 17D that performs monitoring process relating to remote control. As the monitoring process, the mobile-side monitoring unit 17D performs a process of detecting whether there is a transition to the above-mentioned "predetermined operating state". The operation of the mobile-side vehicle control unit 17A, the stop process of the mobile-side stop processing unit 17B, and the notification process of the notification processing unit 17C are to be described below.

Note that, in this embodiment, whether to transition to the "predetermined operating state" is determined by detecting whether to transition to either the sleep state or the background execution state, but what is detected need not be limited to these states.

In short, as the transition to the "predetermined operating state", it is sufficient to detect the transition to the state in which the predetermined user operation is restricted with respect to the control object such as PW 51. In other words, it is sufficient to detect whether the transition is a transition to a state in which the user U cannot stop operation of the control object such as the PW 51 at the desired timing.

For example, if the remote control application is in an inactive state, the remote control application cannot be immediately operated, so the inactive state of the remote control application may be included in the "predetermined operating state" to be detected. If the inactive state commonly shifts to the sleep state, and if the mobile-side monitoring unit 17D can directly detect whether to transition to the inactive state, it is not necessary to detect whether to transition to the sleep state. For example, the inactive state to be detected by the mobile-side monitoring unit 17D may include a state in which the remote control application is terminated by a user operation (including a state immediately before termination), or a state in which the remote control application is forcibly terminated for some reason (including a state immediately before the forcible termination).

As shown in FIG. 2, the vehicle 50 includes a PW 51, a door lock 52, a short-range communication unit 53, a storage unit 54 (memory), and a vehicle-side information processing unit 55. The short-range communication unit 53 has a communication module for performing short-range wireless communication with the short-range communication unit 15 of the mobile device 10, and this short-range communication unit 53 enables the vehicle 50 to communicate with the mobile device 10. The storage unit 54 stores data such as a control program utilized by the vehicle-side information processing unit 55.

The vehicle-side information processing unit 55 is configured with an arithmetic processing circuit including a CPU and peripheral circuits thereof, and functions as a computer that controls each unit of the vehicle 50 according to the control program or the like stored in the storage unit 54. This control program includes a program for performing process corresponding to the remote control application.

The vehicle-side information processing unit 55 executes this control program to function as a vehicle control unit 55A that controls the PW 51 and the door lock 52 based on a signal from the mobile device 10, and a vehicle-side stop processing unit 55B that performs stop process relating to remote control.

As shown in FIG. 2, the vehicle control unit 55A has: a PW control unit 55C that opens and closes the PW 51 based on a signal from the mobile device 10; and a door lock control unit 55D that locks and unlocks the door lock 52 based on the signal from the mobile device 10.

The vehicle-side stop processing unit 55B has a vehicle-side monitoring unit 55E that performs monitoring process relating to remote control. The vehicle-side monitoring unit 55E, as a monitoring process, performs a process of detecting whether to be in a disconnection state in which communication connection between the mobile device 10 and the vehicle 50 is disconnected. The operation of the vehicle control unit 55A, the stop process of the vehicle-side stop processing unit 55B, and the like is to be described below.

Figure 3:
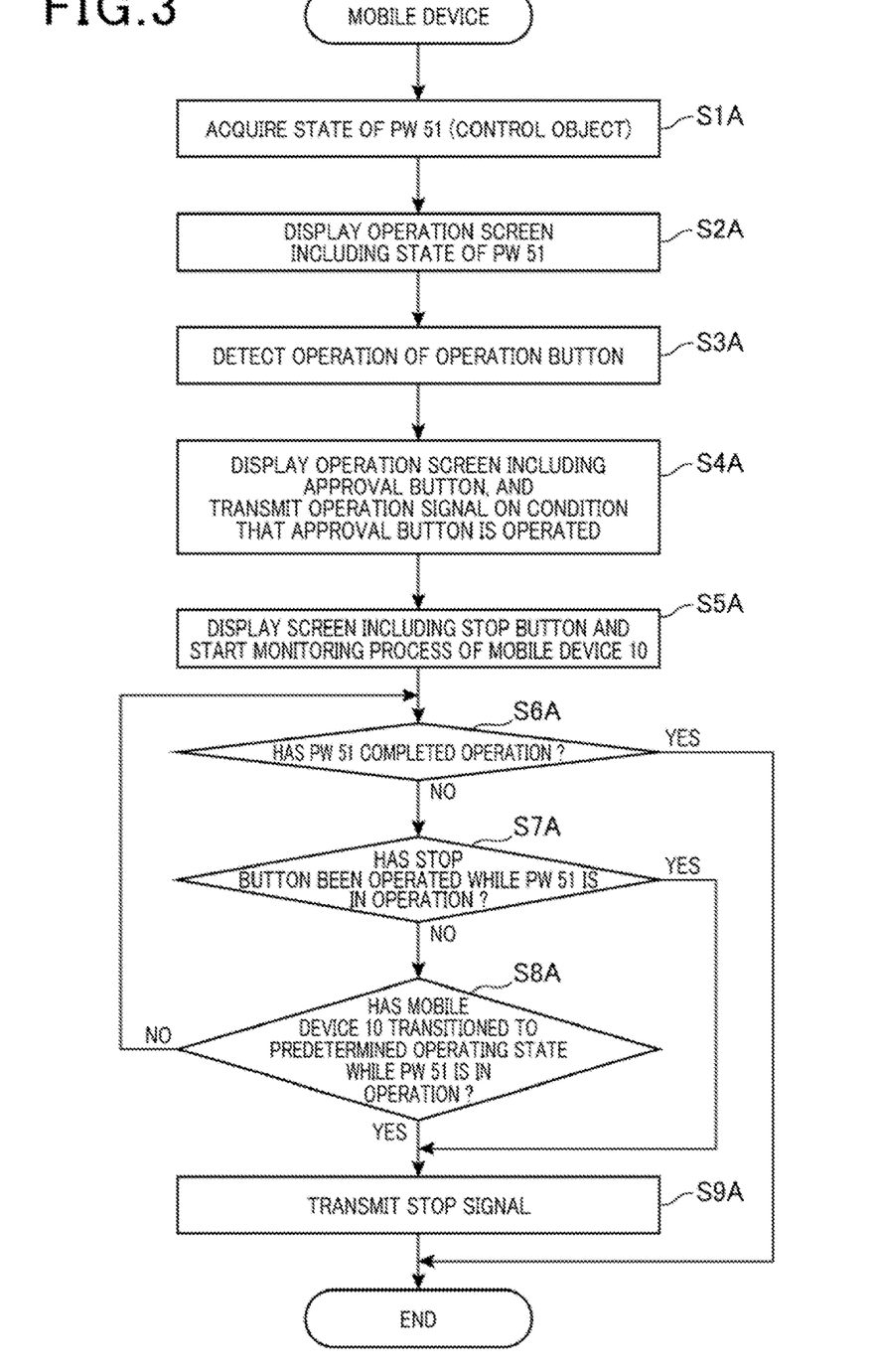
FIG. 3 is a flowchart showing the operation of a mobile device when a PW (power window) is remotely controlled by a remote control application.

FIG. 3 is a flowchart showing the operation of the mobile device 10 when the PW 51 is remotely controlled by the remote control application. At the time of this operation, it is assumed that the mobile device 10 and the vehicle 50 establish communication connection.

In step SA, the mobile-side vehicle control unit 17A communicates with the vehicle 50 by the short-range communication unit 15 to perform a process of acquiring the state of the PW 51 from the vehicle 50. In step S2A, the mobile-side vehicle control unit 17A causes the display unit 12 to display an operation screen including the acquired state of the PW 51.

Figure 4:
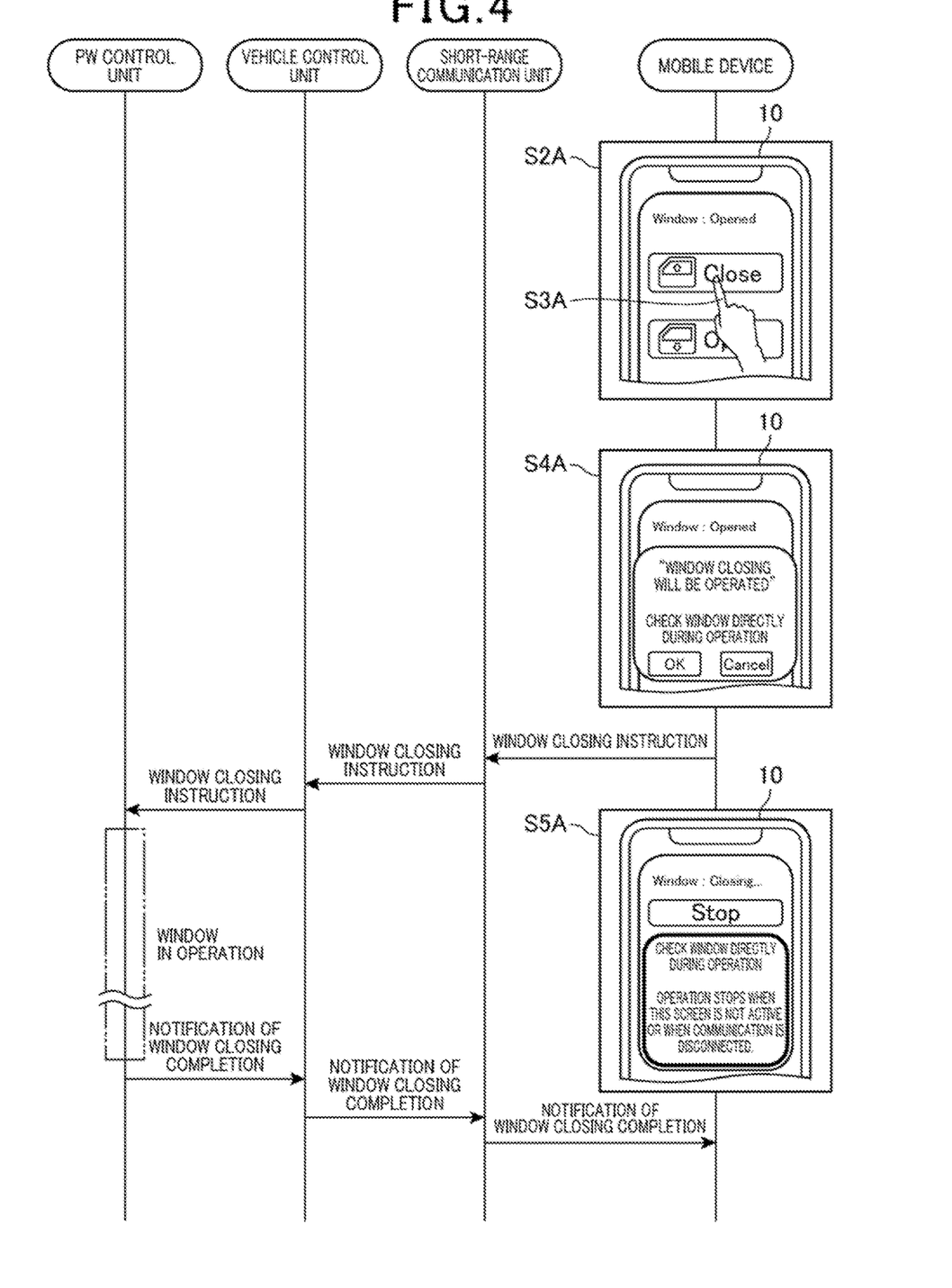
FIG. 4 is a diagram showing an operation example of a vehicle control system when the PW is remotely controlled.

FIG. 4 shows an operation example of the vehicle control system 1 when the PW 51 is remotely controlled, and in FIG. 4 and each figure to be described below, the same steps are given to the parts corresponding to the steps shown in FIG. 3 and the like to denote them.

As shown in FIG. 4, in step S2A, there is displayed the operation screen including: "Opened" indicating the current state of the PW 51; an operation button instructing closing of the PW 51 ("Close" in FIG. 4); and an operation button instructing opening of the PW 5. ("Open" in FIG. 4).

When the user U operates one of the operation buttons, the mobile-side vehicle control unit 17A detects the operation of the operation button (step S3A), to cause the display unit 12 to display an operation screen that includes an approval button ("O" button in FIG. 4), and to cause the short-range communication unit 15 to transmit an operation signal corresponding to the operation button detected in step S2A toward the vehicle 50 on condition that the approval button is operated (step S4A).

As shown in FIG. 4, on the operation screen including the approval button, in addition to the approval button, a disapproval button ("Cancel" button in FIG. 4) is displayed, and warning information to prevent erroneous operation and the like ("Window closing will be operated" and "Check window directly during operation" in FIG. 4) is also displayed. When the disapproval button is operated, the operation signal corresponding to the operation button is not transmitted, and the display is changed to the operation screen in step S2A or the like.

In this embodiment, since the operation signal is not transmitted from the mobile device 10 unless the two operation buttons including the operation button and the approval button are operated, it is easy to prevent the user U from erroneously operating the PW 51. Further, the user U visually recognizes the warning information to prevent an erroneous operation on the PW 51 more easily.

The operation signal (signal indicating the "window closing instruction" in FIG. 4) transmitted from the mobile device 10 is received by the short-range communication unit 53 of the vehicle 50 and is output to the vehicle control unit 55A. As shown in FIG. 4, the vehicle control unit 55A gives a window closing instruction to the PW control unit 55C based on the operation signal, to cause the PW control unit 55C to start the closing operation of the PW 51.

Returning to FIG. 3, the mobile-side vehicle control unit 17A of the mobile device 10 transmits an operation signal for the PW 51 to be controlled based on the user operation, and then shifts the process to step S5A, to cause the display unit 12 to display the screen including a STOP button instructing to stop the operation of the PW 51 (see step S5A in FIG. 4), and to cause the mobile-side monitoring unit 17D to start the monitoring process. This monitoring process monitors whether the mobile device 10 is in a "predetermined operating state".

Next, in step S6A, the mobile-side vehicle control unit 17A determines whether the operation of the PW 51 is completed, that is, whether the closing operation of the PW 51 is completed, to shift the process to step S7A when the closing operation of the PW 51 is not completed, and to terminate the flow shown in FIG. 3 when the closing operation of the PW 51 is completed.

Here, FIG. 4 shows the case where the STOP button has not been operated and the mobile device 10 has not transitioned to the "predetermined operating state". When the closing operation of the PW 51 is completed, information notifying the completion of the closing operation ("notification of window closing completion" in FIG. 4) is notified from the PW control unit 55C to the vehicle control unit 55A, and is transmitted to the mobile device 10 via the short-range communication unit 53. Thus, the mobile-side vehicle control unit 17A can identify whether the closing operation of the PW 51 is completed. For example, when the closing operation of the PW 51 is completed, a notification process may be performed to notify the user U of the mobile device 10 that the closing operation of the PW 51 is completed.

Here, as shown in FIG. 3, the mobile-side vehicle control unit 17A performs the processes of steps S7A to S9A while the PW 51 is in operation.

That is, in step S7A, the mobile-side vehicle control unit 17A determines whether the STOP button is operated while the PW 51 is in operation. When the STOP button is operated, the mobile-side vehicle control unit 17A shifts the process to step S9A to cause the mobile-side stop processing unit 17B, as a stop process, to transmit a stop signal for stopping the PW 51 toward the vehicle 50. As a result, the PW 51 can be stopped quickly. In this configuration, the STOP button is kept displayed while the PW 51 is in closing operation, so that the user U can stop the PW 51 at a desired timing.

On the other hand, when the STOP button is not operated, the mobile-side vehicle control unit 17A shifts the process to step S8A, to determine whether the mobile device 10 transitions to the "predetermined operating state" while the PW 51 is in operation. When the mobile device 10 does not transition to the "predetermined operating state", the mobile-side vehicle control unit 17A shifts the process to step S6A, to repeat the determination process specified in steps S7A and S8A until the closing operation of the PW 51 is completed, the STOP button is operated, or the state transitions to the "predetermined operating state".

In step S8A, when determining that the mobile device 10 transitions to the "predetermined operating state", the mobile-side vehicle control unit 17A shifts the process to step S9A to cause the mobile-side stop processing unit 17B to transmit a stop signal for stopping the PW 51, and stops the PW 51.

Further, if the mobile device 10 can perform the stop signal transmission process also after transition to the "predetermined operating state" (after shift to a sleep state or a state in which the remote control application is in the background), the mobile device 10 may transmit a stop signal after transition to the "predetermined operating state". On the other hand, if the mobile device 10 cannot perform the stop signal transmission process after transition to the "predetermined operating state" due to the specifications of the mobile device 10, the mobile device 10 preferably performs the stop signal transmission process, immediately before or at the same time as transition to the "predetermined operating state".

In either case, when the mobile device 10 transitions to a "predetermined operating state" in which the mobile device 10 cannot remotely control the PW 51 at a timing desired by the user U, it is possible to stop the PW 51 and avoid the situation where the PW 51 continues to operate.

Figure 5:
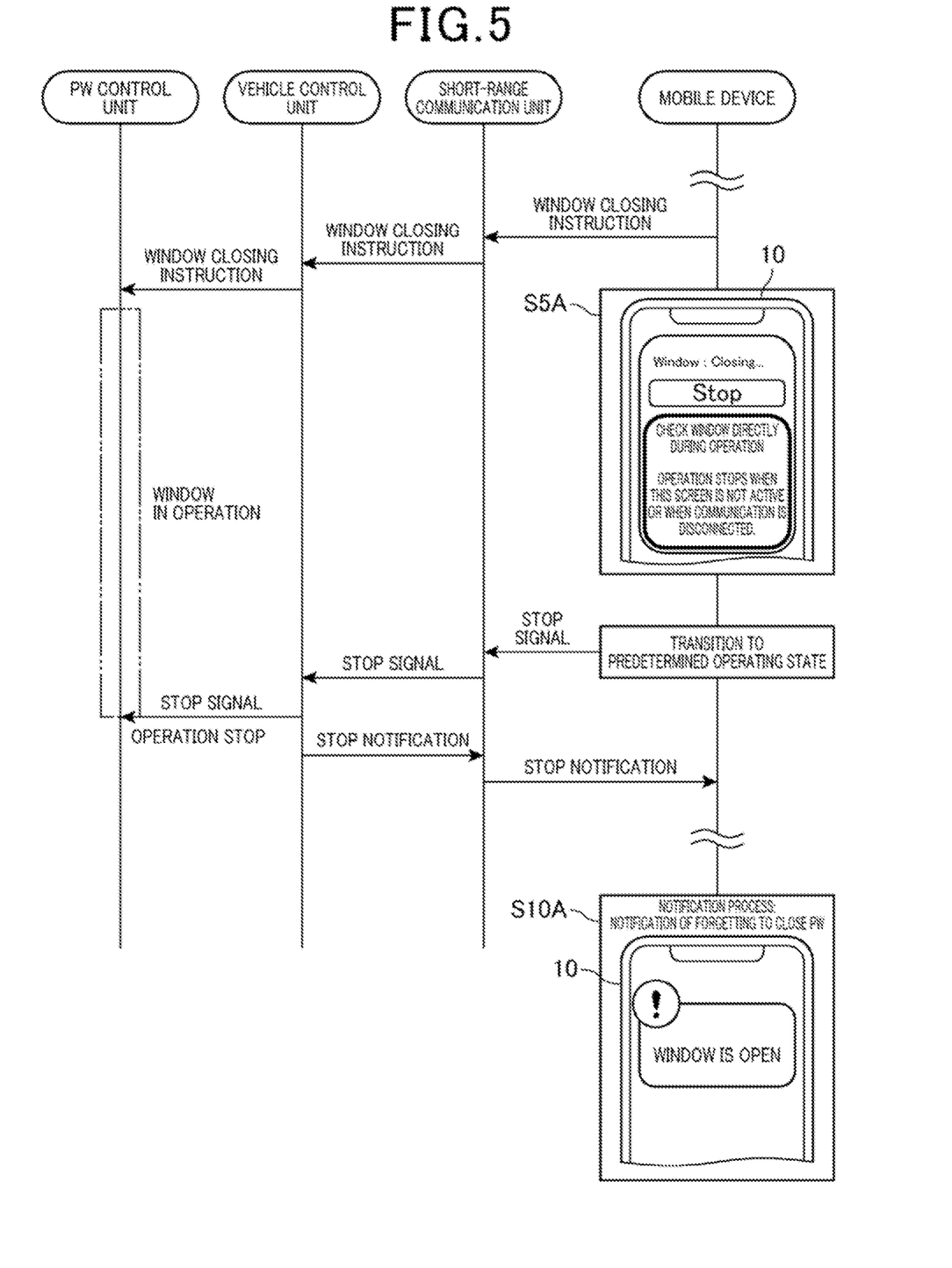
FIG. 5 is a diagram showing an operation when the mobile device transitions to a "predetermined operating state" after step S5A in FIG. 4.

Here, FIG. 5 shows an operation when the mobile device 10 transitions to a "predetermined operating state" after step S5A in FIG. 4. As shown in FIG. 5, when the mobile device 10 transitions to the "predetermined operating state" during operation of the PW 51, the mobile device 10 transmits the stop signal, which is received by the short-range communication unit 53 of the vehicle 50 and is output to the vehicle control unit 55A. The vehicle control unit 55A, upon input of the stop signal, causes the PW control unit 55C to immediately control the stop of the PW 51, and transmits the information for notifying the stop of the W 51 ("stop notification" in FIG. 5) to the mobile device 10 via the short-range communication unit 53.

When the mobile device 10 receives the stop notification of the PW 51, the notification processing unit 17C performs the notification process shown in step S10A in FIG. 5.

Here, the notification processing unit 17C has a function of detecting whether the door lock 52 is locked by a signal from the mobile device 10, based on whether the communication connection between the mobile device 10 and the vehicle 50 has been disconnected, and information (not shown) notified from the vehicle 50.

Note that the point of time when the communication connection is disconnected and the point of time when the door lock 52 is locked correspond to a state in which the mobile device 10 moves out of the communication area of the vehicle 50 and the user U is likely to leave the vehicle 50, which can be regarded as the vehicle separation timing. These points of time are appropriately referred to as "vehicle separation timing" below.

The notification processing unit 17C performs a notification process (step S10A in FIG. 5) for notification of the forgetting to close the PW 51, when the stop process of the PW 51 is performed during closing operation of the PW 51 consisting of the processes of steps S8A and S9A and also during the "vehicle separation timing".

Specifically, as shown in step S10A of FIG. 5, the display unit 12 of the mobile device 10 displays information which notifies that the PW 51 is open (such as a "window is open" message). As a result, the user U can recognize that the window of the vehicle 50 is in the open state and can notice that the window is forgotten to be closed, at a timing when he/she is likely to leave the vehicle 50.

The content of the notification process may be appropriately changed if the forgetting to close the PW 51 can be notified, and the forgetting to close the PW 51 may be notified by voice, for example.

FIGS. 4 and 5 illustrate the cases in which the PW 51 is operated to be closed. On the other hand, in a case where the PW 51 is operated to be opened, the operation signal becomes a signal indicating "window opening instruction", and then the same operation is performed except that the PW control unit 55C operates the PW 51 to open. As a result, when the mobile device 10 transitions to the "predetermined operating state" while the PW 51 is in opening operation, a stop signal for stopping the PW 51 is transmitted from the mobile device 10 to the vehicle 50, and the PW 51 can be stopped immediately.

Further, when the stop process of the PW 51 is performed during opening operation of the PW 51 and also during the above-mentioned "vehicle separation timing", the notification process in step S10A can notify the user U that the opening operation of the PW 51 has been interrupted, that is, it is possible to notify the user U about forgetting to close the window.

Figure 6:
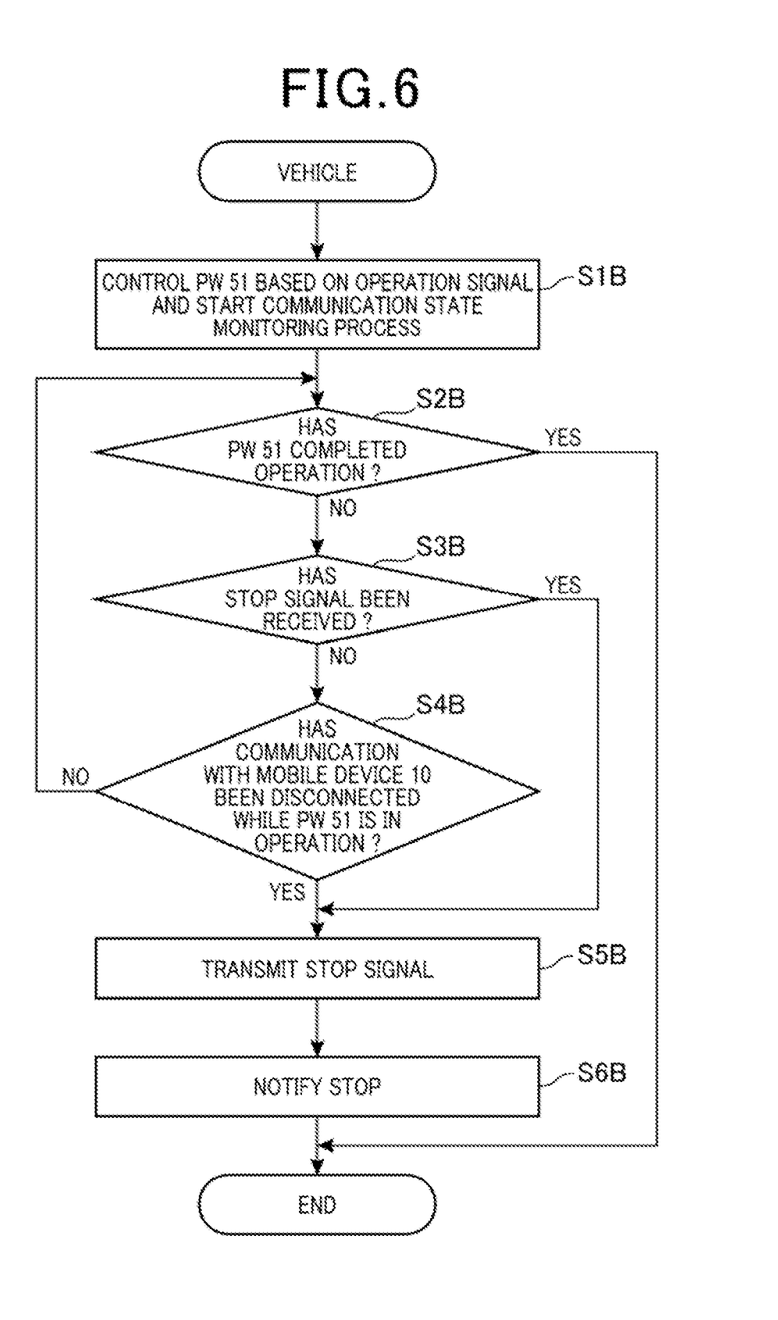
FIG. 6 is a flowchart showing an operation on the vehicle side when PW is remotely controlled by a remote control application.

FIG. 6 is a flowchart showing operation of the vehicle 50 side when the PW 51 is remotely controlled by the remote control application. The flow shown in FIG. 6 is, for example, a process executed when an operation signal of the PW 51 is received from the mobile device.

When the vehicle control unit 55A receives the operation signal of the PW 51 from the mobile device, the PW control unit 55C controls the PW 51 to close or open based on the operation signal, and causes the vehicle-side monitoring unit 55E to start the monitoring process (step S1B). This monitoring process detects whether the communication connection between the mobile device and the vehicle 50 is in a disconnected state.

Next, the vehicle control unit 55A determines whether the operation of the PW 51 is completed (step S2B), and shifts the process to step S3B when the operation of the PW 51 is not completed, and terminates the flow shown in FIG. 6 when the operation of the PW 51 is completed. In step S3B, the vehicle control unit 55A determines whether a stop signal has been received from the mobile device, and shifts the process to step S4B when the stop signal has not been received, and shifts the process to step S5B when the stop signal has been received.

In step S4B, the vehicle control unit 55A determines whether the communication connection between the mobile device and the vehicle 50 is in disconnected state while the PW 51 is in operation, based on the monitoring result of the vehicle-side monitoring unit 55E, and shifts the process to step S2B when the communication connection is not in the disconnected state. Therefore, the processes of steps S2B to S4B are repeated until the operation of the PW 51 is completed, a stop signal is received, or the communication connection between the mobile device and the vehicle 50 becomes in disconnected state while the PW 51 is in operation.

In step S5B, the vehicle control unit 55A transmits a stop signal for stopping the PW 51 to stop the PW 51. When having stopped the PW 51, the vehicle control unit 55A shifts the process to step S6B to transmits information ("stop notification") notifying the mobile device 10 of the stop of the PW 51.

Figure 7:
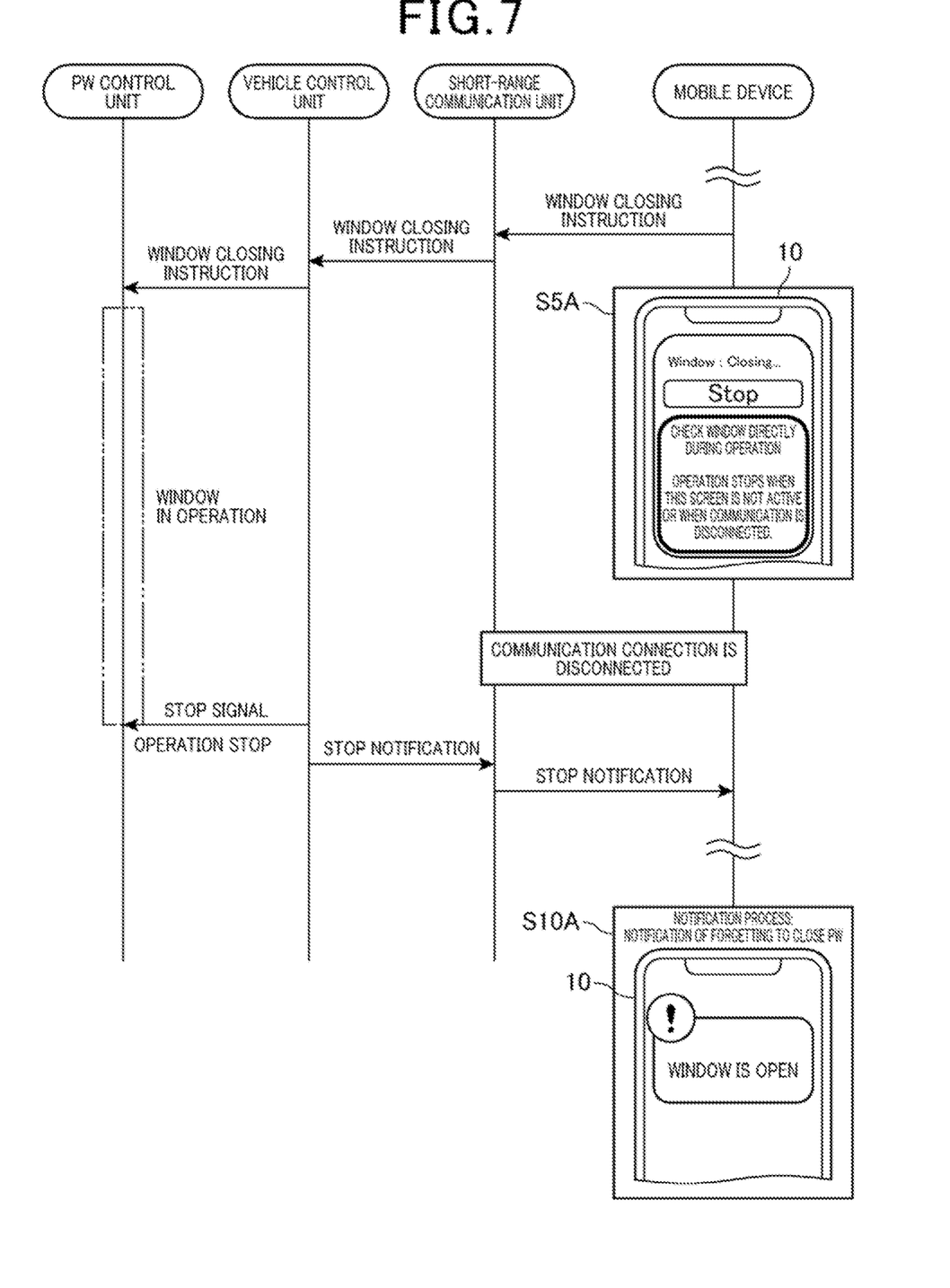
FIG. 7 is a diagram showing an operation when the communication connection between the mobile device and the vehicle is disconnected during closing operation of the PW.

FIG. 7 shows an operation when the communication connection between the mobile device 10 and the vehicle 50 is disconnected while the PW 51 is in closing operation. As shown in FIG. 7, when the communication connection between the mobile device 10 and the vehicle 50 is disconnected, the vehicle-side stop processing unit 55B transmits a stop signal for stopping the PW 51, so that the PW control unit 55C stops the PW 51. As a result, if the communication state between the mobile device 10 and the vehicle 50 becomes a state in which the PW 51 cannot be remotely controlled at a timing desired by the user U, it is possible to avoid the situation where the PW 51 continues to operate.

Further, since the vehicle 50 transmits information for notifying the mobile device 10 of the stop of the PW 51 ("stop notification" in FIG. 7), the mobile device 10 side can identify that the closing operation of the PW 51 is interrupted. Also in the case of FIG. 7, the notification processing unit 17C of the mobile device 10 performs notification process for notification of the forgetting to close the PW 51 in the case of the above-mentioned "vehicle separation timing", so that the user U can notice that he/she has forgotten to close the window. Note that, when the communication connection between the mobile device 10 and the vehicle 50 is disconnected while the PW 51 is in opening operation, the notification process may be performed for notification of the forgetting to close the PW 51.

As described above, the vehicle control system 1 of this embodiment includes: the vehicle control unit 55A that remotely controls the PW 51 which is the control object, based on the signal from the mobile device 10; and a mobile-side stop processing unit 178 that performs a stop process for stopping the PW 51, when the mobile device 10 transitions to a "predetermined operating state" in which user operations are restricted, while the PW 51 is in operation by the remote control. As a result, when the mobile device 10 transitions to the "predetermined operating state", the PW 51 is automatically stopped. This enables the W 51 to be stopped more easily and quickly than in the case where the user U performs a predetermined return operation to stop the PW 51 after the transition to the "predetermined operating state". This can avoid a situation in which the PW 51 continues to operate contrary to the intention of the user U due to the transition of the mobile device 10 to the "predetermined operating state".

Further, the mobile-side stop processing unit 17B is provided in the mobile device 10, and has the mobile-side monitoring unit 17D that detects, as the predetermined operating state, at least one of the state of the mobile device 10 or the state in which the remote control application is executed in the background. The mobile-side monitoring unit 17D can quickly detect, the sleep state or the state in which the remote control application transitions to the background, on the mobile device 10 side, to make it easy to quickly stop the PW 51 of the vehicle 50. Note that, the detection timing may be before the transition, at the same time as the transition, or after the transition if the stop processing or the like (including the notification process) can be executed, but if the stop process or the like cannot be executed after the transition, the detection timing should be before the transition so that the stop process or the like is performed before the transition or at the same time as the transition.

Further, the mobile-side stop processing unit 17B is provided in the mobile device 10, and causes the mobile device 10 to transmit an operation stop signal for stopping the PW 51 when the mobile-side monitoring unit 17D detects a transition to the predetermined operating state while the PW 51 is in operation by the remote control. This makes it easier to quickly stop the PW 51 from the mobile device 10 side.

Further, the vehicle 50 has: the vehicle-side monitoring unit 55E for detecting the disconnected state of the communication connection between the mobile device 10 and the vehicle 50; and the vehicle-side stop processing unit 55B that stops PW 51 when the vehicle-side monitoring unit 55E detects the disconnection state while the PW 51 is in operation by the remote control. As a result, when the mobile device 10 moves out of the communication area of the vehicle 50, or when the user U of the mobile device 10 disconnects the communication connection with the vehicle 50, the PW 51 can be automatically stopped on the vehicle 50 side.

Further, when the stop processing unit (mobile-side stop processing unit 17B, and vehicle-side stop processing unit 55B) performs stop process while the PW 51, which is an open-close device, is in closing operation, the notification processing unit 17C, which the mobile device 10 has, and which performs a notification process for notifying the user U of the mobile device 10 about forgetting to close the PW 51, can convey the forgetting to close the PW 51 caused by the automatic stop of the PW 51, to the user U.

Since this notification process is performed when the stop process is performed while the PW 51 is in closing operation, and when communication is disconnected, such as when the mobile device 10 moves out of the communication area of the vehicle 50, the user U can be notified that the PW 51 has forgotten to be closed when user U is likely to leave the vehicle 50. Here, this notification process may be performed at the timing immediately before the communication connection with the mobile device 10 is disconnected, at the same time as when the communication connection is disconnected, or after the communication connection with the mobile device 10 is disconnected.

Further, this notification process is also performed when the stop process is performed while the PW 51 is in closing operation and the door lock 52 is in locked state, and this also makes it possible to notify the user U of forgetting to close the PW 51 when the user U is likely to leave the vehicle 50.

The above embodiment is merely an aspect of the present invention, and can be modified and applied in any way without departing from the spirit of the present invention.

For example, in the above embodiment, the control objects that can be remotely controlled are the PW 51 and the door lock 52, and the aspects are illustrated, in which the stop process for stopping the PW 51 is performed upon transition to the predetermined operating state while the PW 51 is in operation by the remote control, to avoid the situation where the PW 51 cannot be stopped at the timing desired by the user U, but the present invention is not limited to this.

Control objects that are desirably stopped during operation by the remote control preferably are the ones that require a predetermined time or more (for example, 1 second or more) from the start of operation to the completion of operation, and for example, open-close devices having an automatic open-close function other than the PW 51 are widely applicable. Specifically, the open-close device may be a power slide door or a power door corresponding to a door that automatically opens and closes, or may be a power tailgate (also referred to as an electric rear gate or an automatic tailgate) corresponding to a luggage compartment door that automatically opens and closes.

Further, in the above embodiment, there is illustrated the case where the communication between the vehicle 50 and the mobile device 10 is short-range wireless communication, but the present invention is not limited to this, and for example, the communication may be a what is called medium-range wireless communication.

Further, in the above embodiment, there is illustrated the case where the present invention is applied to the vehicle control system 1 and the mobile device 10 shown in FIGS. 1, 2 and the like, but the present invention need not to be limited to this, and the individual configurations may be changed as appropriate. For example, the case where a smartphone owned by the user U is used for the mobile device 10 is illustrated, but when the vehicle 50 is a rental vehicle, a smartphone set with the rental vehicle may also be used. To the mobile device 10 of the present invention, it is possible to widely apply any mobile devices that can communicate with the vehicle 50 to remotely control the control objects and have a function of transitioning to a predetermined operating state in which a predetermined user operation is restricted.

Further, each configuration shown in FIGS. 1 and 2 may be realized by hardware, may be a configuration realized by collaboration between hardware and software, and may be appropriately changed. Further, the processes corresponding to each step of the flowcharts shown in FIGS. 3, 6 and the like may be divided, merged, or include more processes.

REFERENCE SIGNS LIST 1 vehicle control system
10 mobile device
15 short-range communication unit
16 storage unit
17 mobile-side information processing unit
17A mobile-side vehicle control unit
17B mobile-side stop processing unit
17C notification processing unit
17D mobile-side monitoring unit
50 vehicle
51 PW (power window, control object, open-close device)
52 door lock (control object)
55A Vehicle control unit
55B vehicle-side stop processing unit
55E vehicle-side monitoring unit
U user

What is claimed is:

1. A vehicle control system comprising:
a vehicle having a control object; and
a mobile device capable of communicating with the vehicle, the mobile device having a function of transitioning to a predetermined operating state in which a predetermined user operation is restricted, wherein
the vehicle includes a vehicle-side CPU which remotely controls the control object based on a signal from the mobile device,
the mobile device includes a device-side CPU which performs
a stop process for stopping the control object upon transition to the predetermined operating state while the control object is in operation by the remote control, and
the device-side CPU:
  detects, as the predetermined operating state, at least one of a sleep state of the mobile device or a state in which an application for performing the remote control shifts from a foreground to a background; and
  transmits an operation stop signal for stopping the control object when detecting a transition to the predetermined operating state while the control object is in operation by the remote control immediately before or simultaneously with the transition of the mobile device to the predetermined operating state.

2. The vehicle control system according to claim 1, wherein
the vehicle-side CPU detects
a disconnected state of a communication connection between the mobile device and vehicle, and stops the control object when detecting the disconnection state while the control object is in operation by the remote control.

3. The vehicle control system according to claim 1, wherein:
the control object includes an open-close device having an automatic open-close function; and
the device-side CPU performs a notification process for notifying a user of the mobile device about forgetting to close the open-close device when performing the stop process while the open-close device is in a closing operation.

4. The vehicle control system according to claim 3, wherein the notification process is performed when the stop process is performed while the open-close device is in the closing operation and the mobile device moves out of a communication area of the vehicle.

5. The vehicle control system according to claim 3, wherein:
the mobile device has a function of remotely controlling a door lock of the vehicle, and
the notification process is performed when the stop process is performed while the open-close device is in the closing operation and when the door lock is controlled to a locked state.

6. The vehicle control system according to claim 1, wherein the control object includes at least any of a power window, a power sliding door, a power tailgate, and a power door.

7. The vehicle control system according to claim 1, wherein the communication between the vehicle and the mobile device is short-range wireless communication.

8. A mobile device that can communicate with a vehicle to remotely control a control object belonging to the vehicle and has a function of transitioning to a predetermined operating state in which a predetermined user operation is restricted, the mobile device comprising a CPU, wherein the CPU:
performs a stop process for stopping the control object upon transition to the predetermined operating state while the control object is in operation by the remote control;
detects, as the predetermined operating state, at least one of a sleep state of the mobile device or a state in which an application for performing the remote control shifts from a foreground to a background; and
transmits an operation stop signal for stopping the control object when detecting a transition to the predetermined operating state while the control object is in operation by the remote control immediately before or simultaneously with transition of the mobile device to the predetermined operating state.

9. A vehicle control system comprising:
a vehicle having a control object; and
a mobile device capable of communicating with the vehicle, the mobile device having a function of transitioning to a predetermined operating state in which a predetermined user operation is restricted, wherein
the vehicle includes a vehicle-side CPU which remotely controls the control object based on a signal from the mobile device,
the mobile device includes a device-side CPU which performs a stop process for stopping the control object upon transition to the predetermined operating state while the control object is in operation by the remote control,
the control object includes an open-close device having an automatic open-close function, and
the device-side CPU performs a notification process for notifying a user of the mobile device about forgetting to close the open-close device when performing the stop process while the open-close device is in a closing operation.

* * * * *